(12) United States Patent
Ulli

(10) Patent No.: US 6,827,785 B2
(45) Date of Patent: Dec. 7, 2004

(54) DEVICE AND METHOD FOR APPLYING COATING MATERIAL

(75) Inventor: Andreas Ulli, Berg (CH)

(73) Assignee: Solipat AG, Zug (CH)

( * ) Notice: Subject to any disclaimer, the term of this patent is extended or adjusted under 35 U.S.C. 154(b) by 3 days.

(21) Appl. No.: 10/221,156

(22) PCT Filed: Mar. 19, 2001

(86) PCT No.: PCT/EP01/03102

§ 371 (c)(1),
(2), (4) Date: Nov. 27, 2002

(87) PCT Pub. No.: WO01/07045

PCT Pub. Date: Sep. 27, 2001

(65) Prior Publication Data

US 2003/0180443 A1 Sep. 25, 2003

(30) Foreign Application Priority Data

May 30, 2001 (EP) ............................................. 00105823

(51) Int. Cl.[7] ................................................ B05C 11/02
(52) U.S. Cl. ........................ 118/712; 118/114; 118/117; 118/119; 427/8; 427/365
(58) Field of Search ............................ 427/8, 359, 365, 427/361; 118/712, 110, 114, 115, 117, 119

(56) References Cited

U.S. PATENT DOCUMENTS

| | | | | |
|---|---|---|---|---|
| 3,987,750 A | * | 10/1976 | Knapke | 118/667 |
| 5,409,732 A | * | 4/1995 | Leonard et al. | 427/10 |
| 5,415,720 A | * | 5/1995 | Schonhammer et al. | 156/357 |

FOREIGN PATENT DOCUMENTS

| | | |
|---|---|---|
| DE | 41 11 255 | 10/1992 |
| JP | 07088412 | 4/1995 |
| JP | 10-249402 | * 9/1998 |
| WO | WO 92/13652 | 8/1992 |
| WO | WO 00/29126 | 5/2000 |

* cited by examiner

Primary Examiner—Katherine A. Bareford
(74) Attorney, Agent, or Firm—Shoemaker and Mattare

(57) ABSTRACT

In a device for depositing coating material with the manufacture of coated and/or impregnated sheet formations the thickness of the coated sheet formation is monitored with two metering rollers (11, 13) rotating against the sheet formation. The distance measurement between the contact surfaces (12, 14) of the metering rollers (11, 13) is carried out by way of measuring surfaces (16, 18) concentric to the metering rollers (11, 3) which have a smaller diameter (d1) than the contact surfaces (12, 14).

10 Claims, 2 Drawing Sheets

DEVICE AND METHOD FOR APPLYING COATING MATERIAL

This is national stage appliction of PCT/EP01/03102, filed Mar. 19, 2001.

BACKGROUND OF THE INVENTION

The invention relates to a method and to a device for depositing coating material with the manufacture of coated and/or impregnated sheet formations.

There are known a multitude of methods and devices which are used for the manufacture of coated and/or impregnated sheet formations.

With this for example substrates of various materials, such as plastic, sheet metal or fibre-glass may be coated. With fibre sheet formations such as e.g. tissues, fleece and weavings such methods are not only used for coating but also for strengthening and filling the fibre sheet formation.

For coating, one-component as well as two-component systems or mixtures may be provided which in a fluid state may for example be deposited onto the substrate by extrusion or brushing. A particularly known application of such a method lies in the coating of fibre sheet formations for manufacturing so-called "prepegs" in printed circuit board manufacture.

With this there exists high demands on the accuracy. The thickness of the coated and/or impregnated sheet formation must remain within very small tolerance regions. Coated sheet formations typically have a thickness of the size order of tenths of millimeters—the tolerances range within the micrometer region.

It has therefore already been suggested (see e.g. non-prepublished PCT application PCT/CH/00513) after the depositing of the coating material to provide an adjustable dimensioning gap which is formed by rollers running against the material web.

It has however been ascertained that with this known method the demanded tolerances may no longer be achieved without further ado. In particular a sufficiently large centricity of roller surface and shaft may not be achieved. A certain out-of-center running of the rollers may therefore not be avoided.

SUMMARY OF THE INVENTION

It is therefore the object of the present invention to avoid the disadvantages of that which is known, in particular thus to provide a device and a method for depositing coating material, with which the manufacture of coated and/or impregnated sheet formations is possible with the highest accuracy.

According to the invention this object is achieved with a device and with a method with the features of the characterizing part of the independent patent claims.

The device according to the invention for depositing coating material with the manufacture of coated and/or impregnated sheet formations comprises one or more depositing devices known per se for depositing the coating onto the sheet formations. In the running direction, after the depositing device there is provided a dimensioning gap for dimensioning the thickness of the coated and/or impregnated sheet formation movable through the gap. The width of the dimensioning gap is predeterminable so that the thickness of the coated and/or impregnated sheet formation may be adjusted. The dimensioning gap is limited by at least one metering roller pressable with a contact surface against the sheet formation, and a counter-contact surface. To the metering roller and the counter-contact surface there is in each case allocated a measuring surface. The distance of the measuring surfaces is larger than the dimensioning gap. This permits measuring sensors to be placed between the measuring surfaces, which have no space in the dimensioning gap. In particular the at least one metering roller in the axis direction at at least one end is provided with a cylindrical measuring surface. The cylindrical measuring surface has a smaller diameter than the contact surface of the roller. The device furthermore comprises a measuring arrangement which serves for measuring the distance between the measuring surface and the reference measuring surface which is defined in relation to the counter-contact surface. With the manufacturing procedure of the metering roller and the counter-contact surface the measuring surfaces are formed in an exactly defined position to the contact surfaces.

With the additionally provided measuring surface or surfaces the width of the dimensioning gap may be indirectly very precisely determined. Since the cylindrical measuring surface has a smaller diameter than the contact surface of the roller the distance between the measuring surface and the reference measuring surface with a measuring sensor lying therebetween may be measured without problem. Any occurring out-of-center running between the bearing of the roller and the contact surface of the roller is correctable on account of the measurement of the distance between the measuring surfaces since the measuring surfaces are arranged in an exactly defined relation to the contact surface.

It would however also be conceivable to permit eccentricities between the contact surface and the measuring surface, to determine with a reference measurement and thereafter to compensate by calculation.

According to a particularly preferred embodiment example the counter-contact surface is formed as a second roller. The reference measuring surface is formed as a second cylindrical measuring surface which is arranged at at least one end of the second roller is the axis direction and which has a smaller diameter than the contact surface of the second roller. The second measuring surface is likewise arranged symmetrically and concentrically to the contact surface of the second roller. By way of the fact that the distance between the two cylindrical, concentric measuring surfaces arranged at a known distance to the contact surfaces is measured, indirectly the width of the dimensioning gap may be very accurately determined.

Advantageously the two rollers rotate in the opposite direction to the movement direction of the sheet formation. According to a particularly preferred embodiment example the cylindrical measuring surface or surfaces have a diameter which correspond to more than 50%, advantageously about 70% of the diameter of the contact surface or of the contact surfaces of the roller or rollers. The diameter of the measuring surface is to be selected as large as possible. The closer the measuring surfaces lies to the contact surface the better eccentricities may be avoided since the (smaller) distance between the measuring surface and the contact surface may be more precisely controllable. The measuring surface may however not have the same diameter as the contact surface. In this case the measuring surfaces would lie so close to one another that no sensors may be positioned therebetween. Furthermore there would exist the danger of contamination of the measuring surface by the coating material doctored off with the roller.

According to a further preferred embodiment example the rollers are rotatably mounted such that the bearing of the one roller is fixed and that the bearing of the other roller with respect to the first roller is displaceable perpendicular to the movement direction of the sheet formation. The thickness of the dimensioning gap may be adjusted by displacing the second roller towards the first roller or away from this.

According to a preferred embodiment example the two rollers are pressed together with a predetermined force by pneumatics. The displaceable roller for compensating the out-of-center running is pressable outwards or displaceable inwards, against or with the force of the pneumatics, in particular with a piezoelectric element. The application of a piezoelectric element permits in a particularly simple manner a precise adjusting of the thickness of the dimensioning gap in dependence on the measured distance between the measuring surfaces. With such an arrangement the thickness of the dimensioning gap may also be simply controlled (indirectly via the control of the distance between the measuring surfaces). The device may furthermore be provided with an adjusting arrangement for adjusting the gap width. With this it is additionally conceivable to measure the thickness of the coated sheet formation and to control via the adjusting arrangement. The adjustment of the gap width with the piezoelectric element serves for compensating an out-of-center running, the adjusting arrangement serves for the control of the thickness as a whole.

Advantageously furthermore between the contact surface and the measuring surface there may be arranged an undercut. The undercut avoids a contamination of the measuring surface by coating material doctored from the sheet formation with the contact surface.

The roller or the rollers are furthermore in the known manner provided with a doctor blade with which coating material adhering to the contact surface is removed and advantageously led again to the depositing device.

The measuring arrangement consists advantageously of a contactless sensor, for example of an eddy current sensor. Also other sensors, e.g. optical ones would be conceivable.

The method according to the invention for manufacturing coated and/or impregnated sheet formations may be particularly simply carried out with a device of the described type. The coated and/or impregnated sheet formation is led through an adjustable dimensioning gap between two contact surfaces. According to the invention the distance between measuring surfaces which are defined in relation to the contact surfaces and lie at a greater distance to one another than the contact surfaces are measured. In particular the distance between one measuring surface with a smaller diameter than the cylindrical contact surface and a reference measuring surface defined in relation to the second contact surface is measured. Proceeding with the result of this measurement the width of the dimensioning gap is adjusted, preferably controlled. The invention is thus to the first degree based on providing additional measuring surfaces whose mutual distance may be freely selected without limitation on account of the metering roller design.

BRIEF DESCRIPTION OF THE DRAWINGS

The invention is hereinafter explained in more detail in embodiment examples and by way of the drawings. There are shown in.

DESCRIPTION OF THE PREFRRED EMBODIMENT

Figure 1:
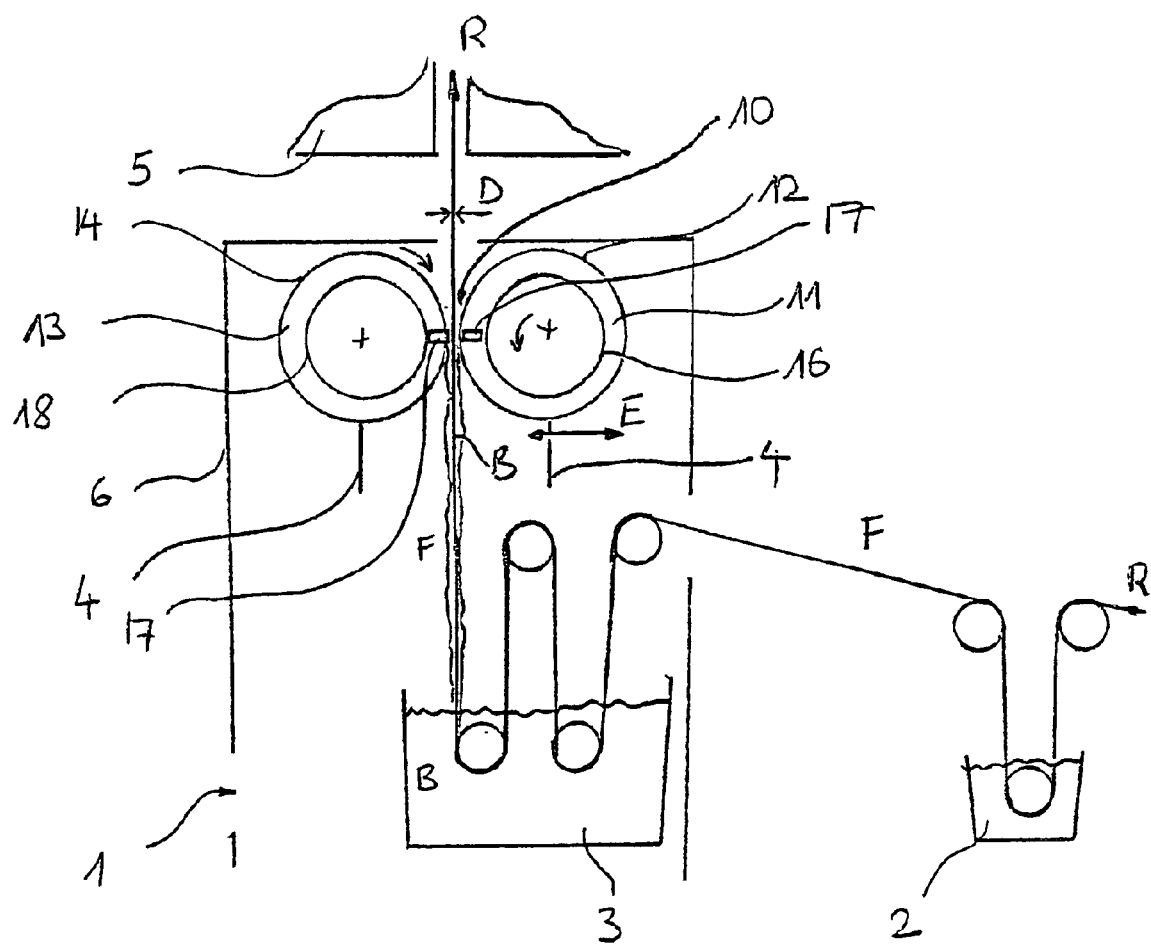
FIG. 1 a schematic representation of a device according to the invention.

In FIG. 1 there is schematically shown a device 1 which serves for manufacturing a coated or impregnated sheet formation F. The sheet formation F is typically a material web, e.g. a fibreglass tissue. The sheet formation F in a movement direction R is firstly moistened in a pre-moistening 2 and subsequently in an impregnating station 3 provided with coating material B. The thickness D of the coated sheet formation is checked in a metering device 6. The sheet formation F coated and/or impregnated in this manner is subsequently led to a drier 5 where the coating material B on the sheet formation F is cured.

The dryer 5, the impregnating station 3 and the pre-moistening 2 are generally common components and therefore will not be gone into in detail here.

The metering device 6 comprises in a known manner two metering rollers 11, 13. The metering rollers 11, 13 form contact surfaces 12, 14 for the coated sheet formation F. Between the contact surfaces 12, 14 there is formed a dimensioning gap 10. The width a (see FIG. 2) of the dimensioning gap 10 defines the thickness D of the coated/impregnated sheet formation F.

The sheet formation F in the vertical direction is led between the metering rollers 11, 13. The metering rollers 11, 13 rotate opposite to the movement direction R of the sheet formation. Typically the metering rollers 11, 13 rotate at about 4 revolutions per minute, which corresponds to about 3 meters per minute. By way of the contact of the coated sheet formation F with the contact surface 12, 14, excess coating material B on the sheet formation is removed from this. By way of a doctor blade 4 the coating material adhering to the contact surface 12, 14 of the metering rollers 11, 13 is doctored off.

The one metering roller 11 is in one direction E displaceable perpendicular to the sheet formation F towards the other metering roller 13. By way of this the width a of the dimensioning gap 10 may be adjusted. The second metering roller 13 is fixedly mounted.

The width a of the dimensioning gap 10 with typical applications is about 0.3 mm. For this reason it is not possible to directly measure the distance between the contact surfaces 12, 14.

Thus at least one of the metering rollers 11, 13, preferably both metering rollers 11, 13 are provided with a measuring surface 16, 18. The measuring surfaces 16, 18 are arranged in the axis direction A at both ends 15 of the metering rollers 11, 13. The measuring surfaces 16 18 run concentrically to the contact surfaces 12, 14. The metering rollers 11, 13 are manufactured as turned parts wherein with the machining of the measuring surfaces 16, 18 the contact surfaces 12, 14 serve as a reference. Even with any occurring out-of-center running of the metering rollers 11, 13 there exists an exactly defined relation between the measuring surfaces 16, 18 and the corresponding contact surfaces 12, 14.

The device 1 is furthermore provided with measuring sensors 17 which measure the distance between the measuring surfaces 16, 18. The measuring sensors 17 are typically contactless sensors, e.g. eddy current sensors of the manufacturer Vibrometer SA.

Figure 2:
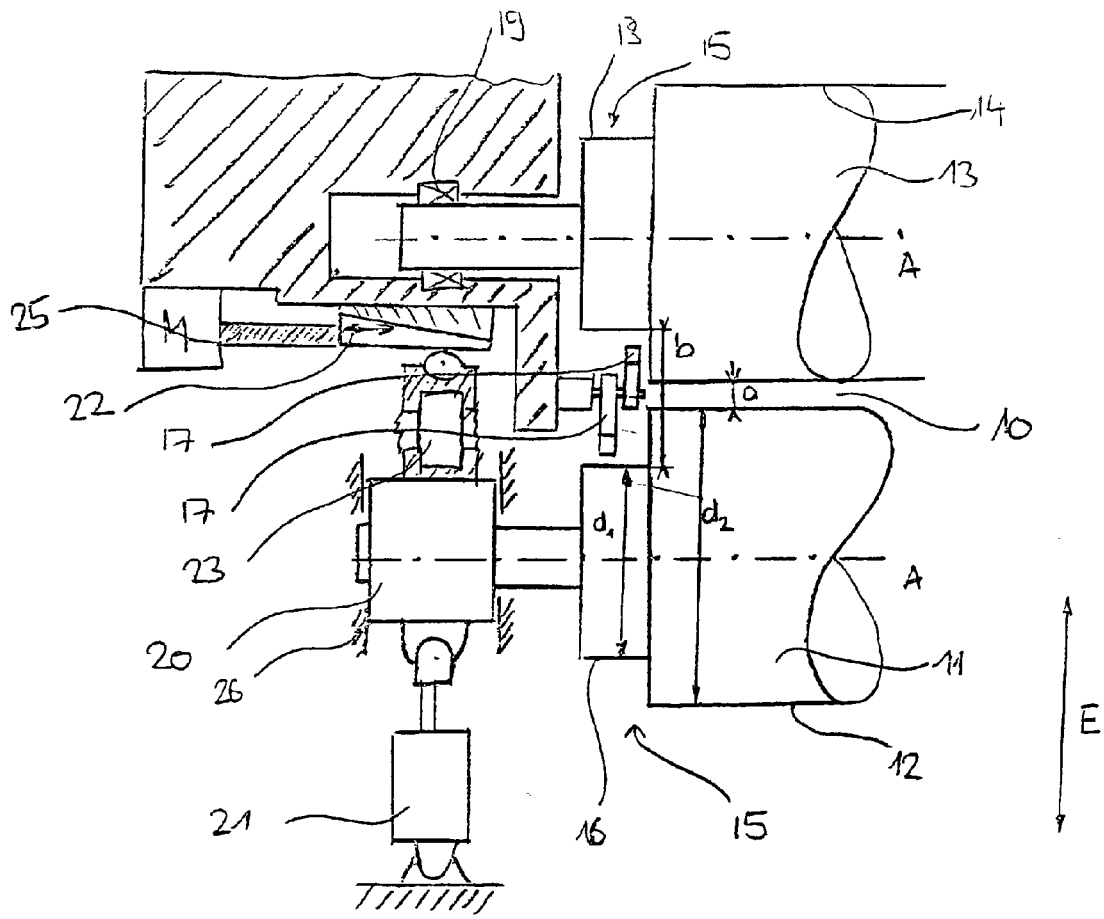
FIG. 2 a schematic representation of the mounting of two contact rollers of a device according to the invention and FIG. 3 a schematic representation of an alternative embodiment example.

In FIG. 2 the mounting of both metering rollers 11, 13 is shown enlarged. A first metering roller 13 with a contact surface 14 is fixedly mounted in a bearing 19. The diameter of the measuring surface 18 is smaller than the diameter of the shaft of the metering roller.

The second metering roller 11 with the contact surface 12 is in a bearing shell 20 on a linear guide 26, displaceably mounted in a direction E perpendicular to the sheet formation F towards the first metering roller 13. The bearing shell 20 for the metering roller 11 is with a pneumatic cylinder 21 tensioned against a piezoelectric element 23. The piezoelectric element 23 is supported on a double wedge 22 which is displaceable by way of a threaded spindle 25 and a motor M.

For adjusting a dimensioning gap 10 to the desired gap width a, firstly the gap a is set to the desired value by displacing the double wedge 22. This value is typically 0.3 mm. The two eddy current sensors 17 are arranged between the measuring surfaces 16, 18 which are at a distance b to one another. The measuring sensors 17 are typically positioned 0.1 and 0.2 mm away from the measuring surface 16 and 18 respectively. In operation the measuring sensors 17 continuously measure the distance to the respective measuring surface 16 or 18. From this the distance b between the measuring surfaces 16, 18 may be determined. On account of the exactly defined relation between the measuring surfaces 16, 18 and the contact surfaces 12, 14 a change in the distance b between the measuring surfaces 16, 18 on account of an out-of-center running corresponds to the change of the gap width a between the contact surfaces 12, 14. A precise monitoring is thus possible since the measuring surfaces precisely e.g. 16, 18 proceeding from the contact surfaces 12, 14 are formed as a reference.

The distance b between the measuring surfaces 16, 18 is controlled via the measuring sensors 17. A voltage dependent on the reading of the measuring sensors is applied to the piezoelectric element 23. In the initial position the piezoelectric element 23 is typically impinged with a voltage of 500 Volts. By variation of the voltage between 0 and 1,000 volts the metering roller 11 may be displaced in both directions, by which means any occurring out-of-center running of the metering rollers 11, 13 may be compensated. The distance b between the measuring surfaces 18 and 16 is thus controlled via the piezoelectric element 23 (input variable: the voltage at the piezoelectric element). The control circuit is not shown in FIG. 2 for representational reasons.

The device according to the invention is in particular to be applied with the impregnation of sheet formations with solvent-containing resins. It is therefore important that all applied elements are explosion-safe. As measuring sensors 17 therefore eddy current sensors (manufacturer Vibrometer) are used. The piezoelectric element 23 is accommodated in a housing in an explosion-safe manner.

The pneumatic cylinder 21, the bearing shell 20, the piezoelectric element 23, the double wedge 22 and the bearing 19 lie in one plane.

The diameter of the measuring surfaces 16, 18 are to be selected as large as possible. In this manner as small as possible tolerances with respect to the contact surfaces 12, 14 may be achieved. The contact surfaces 12, 14 have a diameter d2. In a certain embodiment example the diameter d2 of the contact surfaces 12, 14 is 240 mm whilst the diameter d1 of the measuring surfaces 16, 18 is 170 mm. The diameter d1 is chosen just so high that the measuring sensors 17 may still be positioned between the measuring surfaces 16, 18.

The differing diameters d1, d2 furthermore prevent the contamination of the measuring surfaces 16, 18 by the coating material B adhering to the contact surfaces 12, 14.

The control of the gap width a is effected with a frequency of about 30 Hertz.

Figure 3:
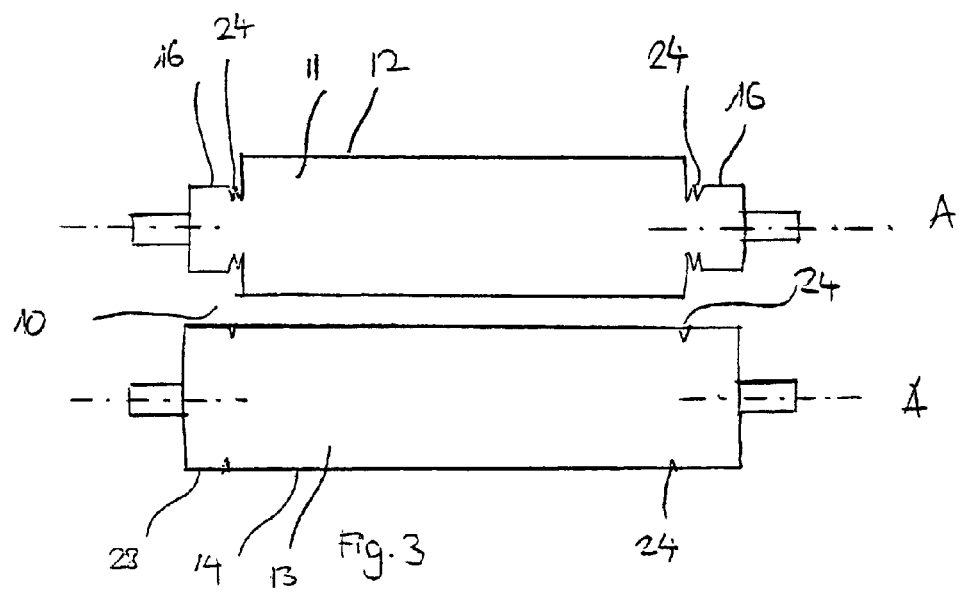

In FIG. 3 there is schematically shown an alternative embodiment example. According to this example it is also conceivable to only provide the one metering roller 11 with a measuring surface 16 with a smaller diameter, whilst the measuring surface 28 on the other metering roller 13 is formed as a continuation of the contact surface 14. This arrangement too permits the positioning of measuring sensors between the two metering rollers 11, 13. In the embodiment example in FIG. 3 there is furthermore shown an undercut 24 between the measuring surface 16 and the contact surface 12 of the one metering roller 11. The undercut 24 prevents a spillage of coating material M from the contact surface 12 onto the measuring surface 16. Likewise there is provided an undercut 24 on the other metering roller 13 which separates the contact surface 14 thereof from the measuring surface 28.

Preferably the measuring surfaces seen in the axis direction A are arranged on both sides of the rollers 11, 13—likewise measuring sensors are also arranged on both sides. It is however also conceivable the carry out the measurement only on one side.

With certain applications it is also conceivable to define the dimensioning gap only on one side with a rotatable roller whilst the sheet formation on the other side is led over a fixed counter-contact surface.

What is claimed is:

1. An apparatus for depositing a coating material on a web material during the manufacture of coated and/or impregnated web materials, said apparatus having at least one depositing device for depositing the coating material onto the web material, and at least one metering roller having a contact surface which can be pressed against the web material, and a counter-contact surface, said contact surface and said counter-contact surface having therebetween a dimensioning gap of a predeterminable width for determining the thickness of the web material movable through the gap, each of said metering roller and said counter-contact surface having a respective measuring surface whose distance from one another is larger than the width of the gap, and further comprising a measuring arrangement for measuring the distance between said measuring surfaces, the counter-contact surface being a second metering roller and the measuring surface associated with said counter-contact surface being a second cylindrical measuring surface whose diameter is smaller than the diameter of the second roller.

wherein said metering rollers are mounted for rotation in directions opposite to the movement direction of the web material at a point where the roller contacts the web material.

2. A device according to claim 1, wherein at least one end of the metering roller has a cylindrical measuring surface associated therewith whose diameter is smaller than the diameter of the contact surface of the metering roller.

3. A device according to claim 2, wherein the cylindrical measuring surface has a diameter which is greater than 50% of the diameter of the contact surfaces.

4. A device according to claim 2, wherein the cylindrical measuring surface has a diameter which is greater than 70% of the diameter of the contact surfaces.

5. A device according to claim 1, wherein the rollers are rotatably mounted on respective bearings, the bearing of the first roller is fixed, and the bearing of the second metering roller is displaceable relative to the other metering roller in a direction perpendicular to the web material to compensate for eccentric running.

6. A device according to claim 5, further comprising a pneumatic cylinder for pressing one metering roller against the other metering roller with a predetermined force, and means for adjusting the width of the dimensioning gap.

7. A device according to claim 6, further comprising a piezoelectric element for moving the metering rollers with or against the force of the pneumatic cylinder.

8. A device according to claim 1, further comprising at least one undercut on the metering roller between the contact surfaces and the measuring surfaces.

9. A device according to claim 1, wherein the measuring arrangement comprises at least one contactless sensor.

10. A device according to claim 9, wherein the contactless sensor is an eddy current sensor.

* * * * *